(12) United States Patent
Lin et al.

(10) Patent No.: US 7,668,920 B2
(45) Date of Patent: Feb. 23, 2010

(54) ELECTRONIC MESSAGE AND DATA TRACKING SYSTEM

(75) Inventors: Kunhua Lin, Coquitlam (CA); Michael Xie, Palo Alto, CA (US)

(73) Assignee: Fortinet, Inc., Sunnyvale, CA (US)

( * ) Notice: Subject to any disclaimer, the term of this patent is extended or adjusted under 35 U.S.C. 154(b) by 621 days.

(21) Appl. No.: 11/366,673

(22) Filed: Mar. 1, 2006

(65) Prior Publication Data

US 2007/0208850 A1  Sep. 6, 2007

(51) Int. Cl.
*G06F 15/16* (2006.01)
*G06F 15/173* (2006.01)
*H04L 9/32* (2006.01)

(52) U.S. Cl. .............. 709/206; 709/223; 709/224; 709/229; 713/176; 713/170

(58) Field of Classification Search ......... 709/206–207, 709/217, 223–224, 202, 229; 713/170, 176
See application file for complete search history.

(56) References Cited

U.S. PATENT DOCUMENTS

| | | | | |
|---|---|---|---|---|
| 6,654,787 | B1* | 11/2003 | Aronson et al. | 709/206 |
| 2002/0162025 | A1* | 10/2002 | Sutton et al. | 713/201 |
| 2004/0019651 | A1* | 1/2004 | Andaker | 709/207 |
| 2004/0054886 | A1* | 3/2004 | Dickinson et al. | 713/153 |
| 2004/0193922 | A1* | 9/2004 | Bandini et al. | 713/201 |
| 2005/0081059 | A1* | 4/2005 | Bandini et al. | 713/201 |
| 2005/0108340 | A1* | 5/2005 | Gleeson et al. | 709/206 |
| 2006/0206713 | A1* | 9/2006 | Hickman et al. | 713/176 |

* cited by examiner

*Primary Examiner*—Wing F Chan
*Assistant Examiner*—Benjamin M Thieu
(74) *Attorney, Agent, or Firm*—Hamilton, DeSanctis & Cha, LLP

(57) ABSTRACT

Systems and methods for tracking electronic messages and data are provided. According to one embodiment, steps for tracking an email message, or other electronic message, may include identifying an email message for tracking, associating a linking object with the tracked message, and responsive to activation of the linking object by a receiver of the electronic message, automatically submitting information regarding the electronic message to be tracked to a designated resource. According to various embodiments, a linking object may include a Universal Resource Identifier (URI), a java script, an executable file, a visual basic script (VBS), and/or the like. In accordance with one embodiment, the linking object facilitates submission of information regarding the tracked email message to an anti-spam system by a receiver of the tracked email message.

10 Claims, 3 Drawing Sheets

ELECTRONIC MESSAGE AND DATA TRACKING SYSTEM

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2005-2006 Fortinet, Inc.

FIELD

Various embodiments of the present invention generally relate to tracking and storage of electronic messages, such as email messages. In particular, embodiments relate to the tracking and storage of messages which have been identified as spam or virus-infected by an appropriate service.

BACKGROUND

One of the problems arising with the proliferation of Internet and email usage, as well as other means of electronic communication, is the receiving of unwanted and unsolicited bulk messages, commonly known as "spam". While similar to the problems associated with physical junk mail, the consequences can be much more severe. Spam can contain viruses or other software that disable or damage the receiver's computer or other electronic equipment. In addition, the volume of spam may represent a significant load on the traffic handling mechanisms. For example, high volumes of email spam may negatively affect both client computer networks and the Internet itself. As a result, substantial efforts have been devoted to tracking and identifying spam in order to stop the problem at its source.

Currently, anti-spam services rely heavily on user feedback to refine the algorithms used to define and mark spam. This user feedback is important in two ways. First, new spam sources can be identified before they have a chance to proliferate. Second, and potentially more important for end-users, is the identification of false positives, or messages that have been falsely identified as spam by the algorithm.

Many anti-spam services mark the message header so that the user can readily identify the message as spam once the message is received by the user. The onus is then on the user to submit a misidentified message to a designated email address using their email client program. While this process is in common usage, it suffers from several limitations.

In the context of email spam, the reliance on the user's email client means that the instructions for submitting emails can be quite extensive and can vary substantially depending on which email client is used. As a result, the user can be discouraged from submitting emails due to the steps involved. This makes it difficult to improve the rate of false positives and refine the algorithms in the anti-spam service.

Related to this complexity, the user is required to remember the correct email address to submit information about false positive messages. Furthermore, the user is required to go through the process of forwarding the message through their email client. Even in a Graphic User Interface (GUI), this process still requires selecting the spam message, marking it for forwarding, entering the address and sending the forwarded message. This process can take some time, especially if multiple messages are identified and need to be forwarded.

The user's email client can also pose a problem. There are numerous email clients in use and they can vary significantly in functions and features. In particular, some clients do not support forwarding email messages in their original form as an attachment, rather they are sent after being reformatted, such as lines broken into a fixed number of characters per line, headers removed, etc. As a result, the message received by the anti-spam system may not be in its original form. This can create difficulties for the anti-spam system and staff in analyzing the email message forwarded by the user.

Additionally, the user may not want to forward the entire email message to the anti-spam system because of privacy concerns. The user typically cannot submit the signatures of the email, as he or she is not aware of the signatures of the email that mark the email message as spam.

Finally, the user's Internet Service Provider (ISP) may not allow the user to submit spam over its network. Some ISPs drop spam in their outgoing email and if the anti-spam system is not part of their network, the message will not be sent, preventing this existing method of submitting emails from functioning.

Another method of submitting email for spam analysis requires saving the email as a file and transferring the file to the anti-spam system manually or through a file transfer mechanism, such as File Transfer Protocol (FTP). This process is even more demanding and time consuming for the user than forwarding the original message. Also, the email is transformed from one format to another as part of the process and the original content may be lost or damaged, potentially rendering it useless to the anti-spam system.

Therefore, there is a need for an anti-spam system that facilitates user submission of information and/or feedback regarding electronic messages marked as spam.

SUMMARY

Systems and methods are described for tracking electronic messages and data. Examples of electronic messages include, but are not limited to, email messages, instant messaging, Usenet newsgroup, wikis, guestbooks, web search engines, weblogs, mobile phone text messaging, and/or the like. According to one embodiment, steps for tracking an email message, or other electronic message, may include identifying an email message for tracking, associating a linking object with the tracked message, and responsive to activation of the linking object by a receiver of the electronic message, automatically submitting information regarding the electronic message to be tracked to a designated resource. According to various embodiments, a linking object may include a Universal Resource Identifier (URI), a java script, an executable file, a visual basic script (VBS), and/or the like. In accordance with one embodiment, the linking object facilitates submission of information regarding the tracked email message to an anti-spam system by a receiver of the tracked email message.

Some embodiments of the present invention may be used to identify and track email messages, other electronic messages, and/or data defined as spam or defined as containing viruses.

According to one embodiment, a URI, or other linking object, may be used to retrieve the tracked email message in its entirety. In some embodiments, a linking object may be used to retrieve just the electronic message signatures from the tracked message.

In accordance with various embodiments, a system of scanning and tracking email messages, consisting of a Universal Resource Identifier (URI) insertion device for scanning email messages and inserting a URI into an email message to be tracked and an email submission server for receiving emails sent via the inserted URI by a receiver of the tracked email message may be provided.

In one embodiment, the system may also include an email storage server operative to store an archive of all email messages with which a linking object has been associated by the linking object insertion device. For example, the system may archive email messages into which a URI has been inserted by a URI insertion device. The email submission server can then be used to retrieve the tracked email message from the email storage server.

In one embodiment, the system may combine the linking object, such as a URI, insertion device and the email storage server into a single device.

A more complete understanding of various embodiments of the present invention may be derived by referring to the detailed description of preferred embodiments and claims when considered in connection with the figures.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

Figure 1:
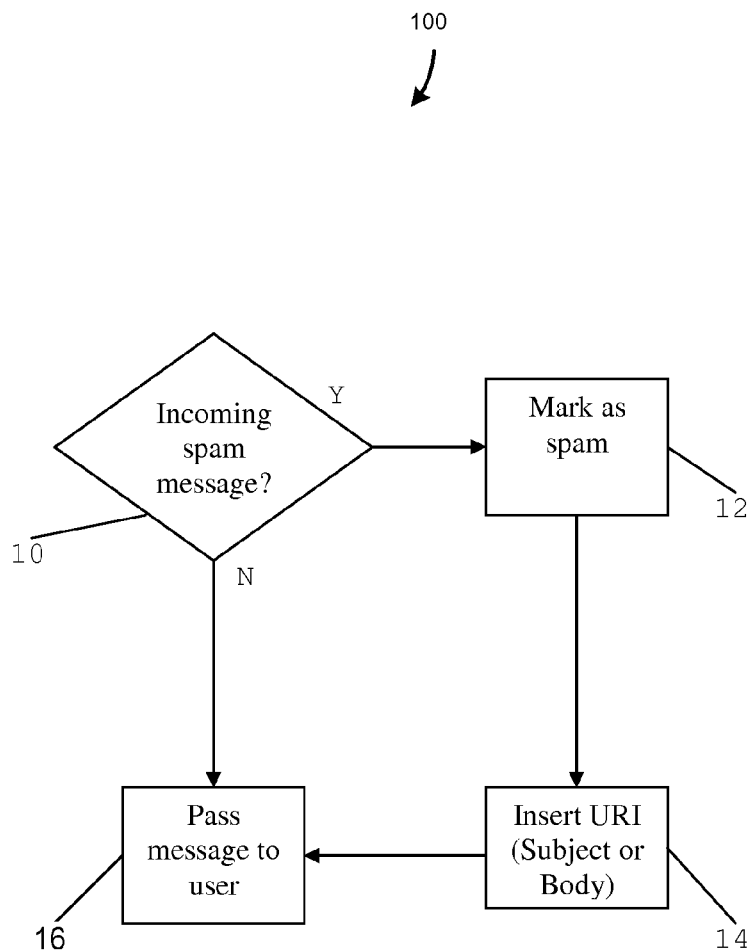
FIG. 1 illustrates a flowchart describing a method of marking spam and user submission of messages in accordance with various embodiments of the present invention.

Various embodiments of the invention both as to organization and method of operation, as well as additional objects and advantages thereof, will become readily apparent from the following detailed description when read in connection with the accompanying drawings.

DETAILED DESCRIPTION

Embodiments of the present invention relates generally to tracking and storage of electronic messages, such as email messages, for example. In particular, some embodiments relate to electronic messages, such as email messages, which have been identified as spam or virus-infected by an appropriate service, such as a real-time email spam filter (e.g., FortiGuard antispam subscription service) and/or a real-time email virus scanner (e.g., FortiGuard antivirus subscription service).

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention are described with reference to a tracking and storage of email messages, embodiments of the present invention are equally applicable to various other types of electronic messages and data.

For the sake of illustration, various embodiments of the present invention have herein been described in the context of computer programs, physical components, and logical interactions within modern computer networks. Importantly, while these embodiments describe various aspects of the invention in relation to modern computer networks and programs, the method and apparatus described herein are equally applicable to other systems, devices, and networks as one skilled in the art will appreciate. As such, the illustrated applications of the embodiments of the present invention are not meant to be limiting, but instead exemplary. Other systems, devices, and networks to which embodiments of the present invention are applicable include, but are not limited to, other types communication and computer devices and systems. More specifically, embodiments are applicable to communication systems, services, and devices such as cell phone networks and compatible devices. In addition, embodiments are applicable to all levels of computing from the personal computer to large network mainframes and servers.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection one with another. Based on the disclosure provided herein, one of ordinary skill in the art will appreciate a variety of ways in which connection or coupling exists in accordance with the aforementioned definition.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

The phrase "linking object" generally refers to one or more commands embedded within or otherwise associated with a document, which when accessed/activated by a user, automatically connects to a designated resource. In one embodiment, linking objects are embedded within certain electronic messages, such as spam, to provide recipients of such messages an easy mechanism for reporting spam to an anti-spam system. In one embodiment, a linking object may be activated by selecting the linking object with a single action of a user input device, such as a single click of a mouse. In other embodiments, a linking object may request additional information from the user such as if the user desires the sender to be placed on a whitelist, a blacklist, and/or the like. According to some embodiments, linking objects may be implemented using various available methods. For example, in one embodiment, a linking object may be a URI embedded in an email message. In some embodiments, a linking object may be implemented using an embedded java script, a executable file, a visual basic script and the like.

If the specification states a component or feature "may", "can", "could", or "might" be included or have a characteristic, that particular component or feature is not required to be included or have the characteristic.

The term "responsive" includes completely or partially responsive.

The term "spam" generally refers to the abuse of any electronic communications medium to send unsolicited messages in bulk. In one embodiment, the term "spam" refers to an unsolicited and unwanted message that is delivered via e-mail. In other embodiments, the term "spam" includes unwanted, unsolicited messages in a variety of communication media formats. Examples of common communication media include, but are not limited to, e-mail, instant messaging, Usenet newsgroup, wikis, guestbooks, web search engines, weblogs, mobile phone text messaging, and/or the like.

FIG. 1 illustrates a flowchart 100 describing the method of marking spam and user submission of messages in accordance with various embodiments of the present invention. According to one embodiment, an anti-spam system may be configured to scan incoming emails and determine which messages, if any, should be identified and marked as spam. In step 10, a determination is made whether the message is spam. If not, the message passes through 16 to the user as per the usual process. If the message is spam, it is marked as spam 12 and a URI (Universal Resource Identifier) is inserted 14 into the message. This URI may be located in the Subject area or in the Body of the email message. The email is then passed on 16 to the user. In some embodiments, another type of linking object such as a java script, executable file, and/or the like may be inserted into the message.

When the user receives the marked message, the email can then be submitted to the anti-spam system by clicking on the link provided by the URI or other linking object. According to some embodiments, the URI, or other linking object, may contain all the necessary information and instructions for contacting the anti-spam system. For example, in one embodiment, a single click of the mouse is all the input required from the user. As such, no additional information needs to be memorized or submitted by the user.

According to one embodiment, the URI, or linking object, may be encoded with a reference to the original email included as an attachment to the email sent by the URI, or linking object. In one embodiment, the linking object may be encoded with information including the server address information in order to retrieve the original email directly from the original server. Alternatively, in some embodiments, the URI, or linking object, can contain only the signatures from the email or similar information deemed necessary for spam analysis. Using this latter method has the additional advantage of preserving the privacy of the content of the original email.

Generally, the need for user input in an anti-spam system is to identify false positives, i.e. email messages marked as spam which are not such.

Figure 2:
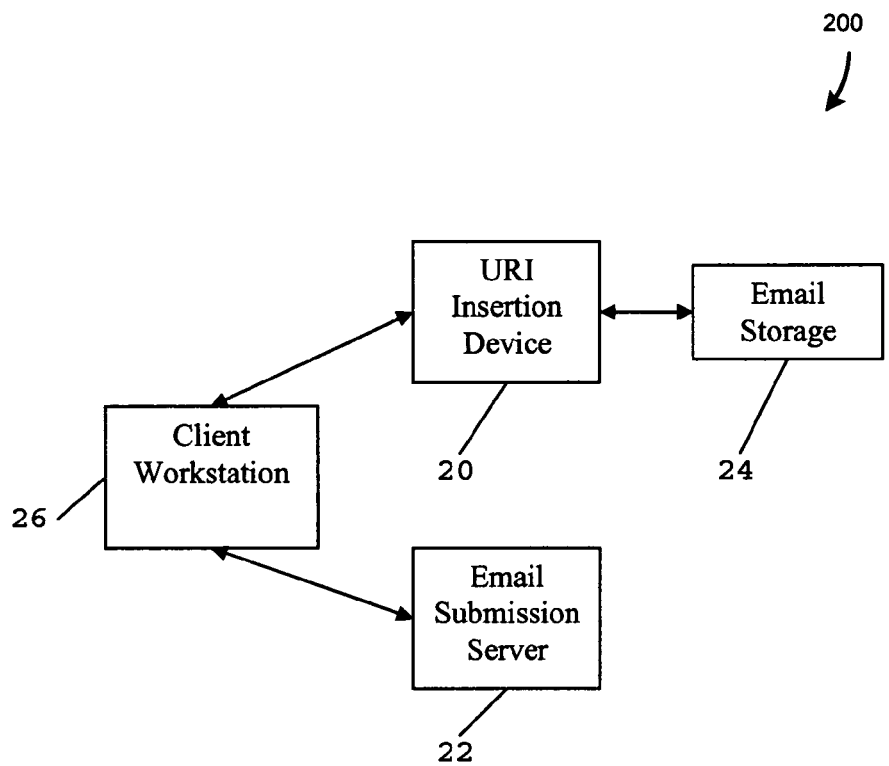
FIG. 2 illustrates a block diagram showing a network for tracking email messages in accordance with one or more embodiments of the present invention.
Figure 3:
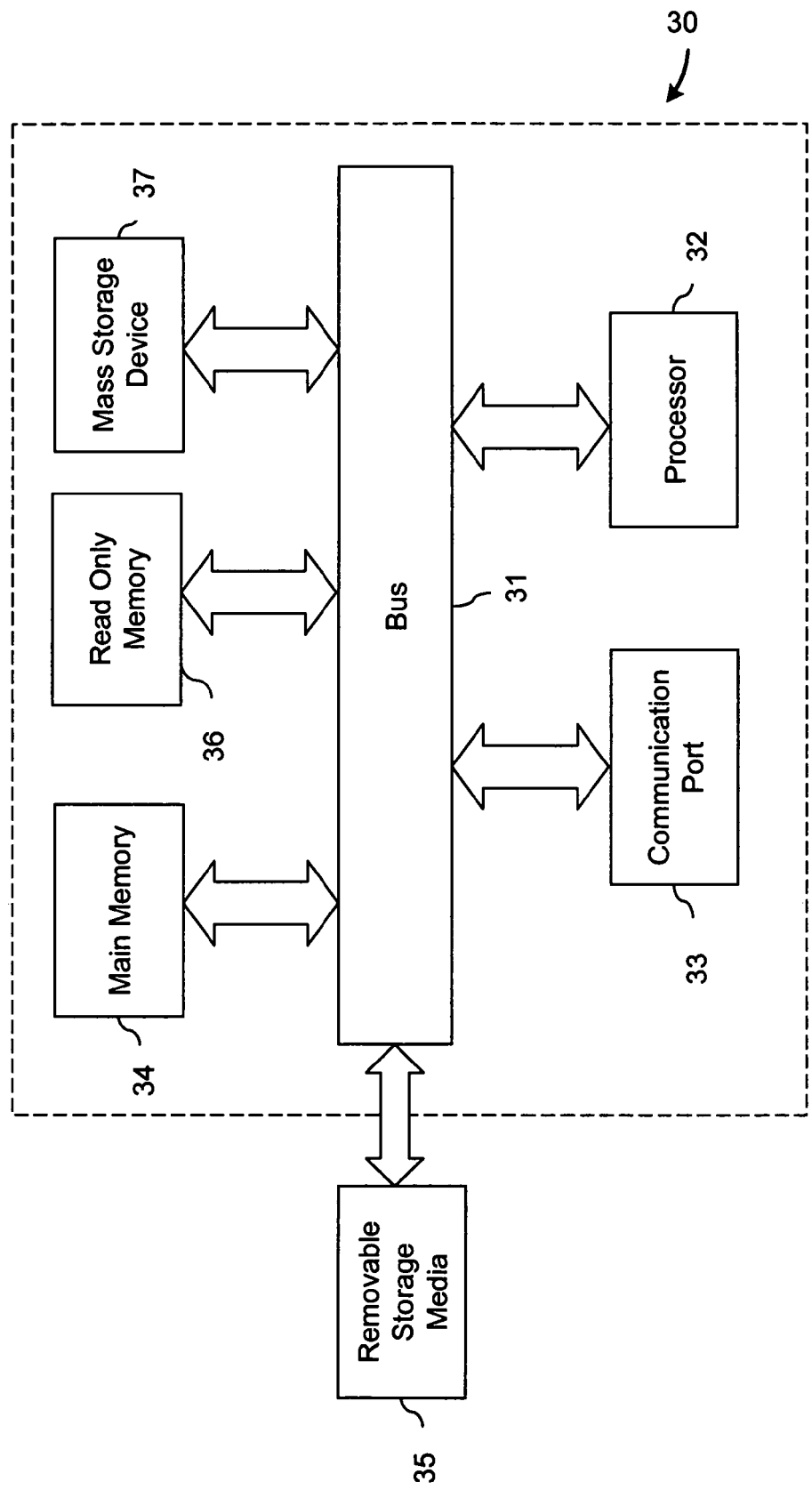
FIG. 3 illustrates an example of a computer system with which embodiments of the present invention may be utilized.

FIG. 2 illustrates a block diagram 200 showing a network for tracking email messages in accordance with one or more embodiments of the present invention. In accordance with various embodiments, a submission method, such as a single-click submission method, may be incorporated into a complete email tracking system. The first element is the URI, or linking object, insertion device 20. In one embodiment, the linking object insertion device may be configured to encode a linking object, such as a URI, and insert the linking object into a marked electronic message, such as an email. According to one embodiment, this device may be incorporated into an email server, a firewall with email scanning capabilities, communication servers or, more generally, any anti-spam device or system that is capable of scanning electronic messages, such as email messages, and detecting which ones are spam.

In accordance with the embodiment depicted, an email submission server 22 to receive email submissions from users who click on the URI may also be provided. In one embodiment, server 22 may be the destination address encoded into the URI. However, as described below, server 22 may also have additional functions.

In some embodiments, the full electronic message or data may be submitted for analysis. For example, if a full email message is to be submitted for analysis, then an email storage server 24 is also required. This server keeps an archive of all emails that have had URIs, or linking object, inserted into them by the insertion device 20. The email submission server 22 can then retrieve the full email message from the email storage server 24 when the corresponding email is received from the user. In other embodiments, digital signatures of the electronic message or data may be submitted. For example, if only email signatures are collected, then the email storage server 24 is not necessary.

FIG. 2 also depicts an email client workstation 26. This workstation is where the user runs their email client, such as Microsoft Outlook®. According to one embodiment, when the user receives a message that is falsely identified as spam, or requires further analysis, they click on the URI, or linking object embedded within the message, and submit an email to the email submission server 22. While the email client workstation 26 forms a part of the whole system according to one embodiment, it will typically be provided by the user and not the anti-spam system provider.

For practical purposes, according to one embodiment, the email storage server 24 can be combined with the insertion device 20 into a single device. According to some embodiments, insertion device 20 may be implemented in hardware, software, and/or a combination thereof. Furthermore, insertion device 20 may be associated and/or implemented at a variety of levels. For example, insertion device 20 may be implemented by an enterprise, a communications service provider, an end user, and/or the like.

While the above description uses the single-click submission method for detecting spam email messages, it can be effectively used for any application where any electronic message, such as an email message, or its signatures needs to be submitted to a system for analysis. For example, an anti-virus system can insert a URI, or linking object, into a quarantined email if a virus is present. According to one embodiment, the URI may provide a link for the user to review the email in a protected environment, to release the message from quarantine or to provide feedback to the anti-virus system.

Also, while some applications (and even some anti-spam applications) may require further user input after clicking on the URI, use of the single-click method is still beneficial. By minimizing the user's steps to initiate the process, the likelihood of the user proceeding with the process and providing the necessary information is greatly enhanced.

Exemplary Computer System Overview

Embodiments of the present invention include various steps, which will be described in more detail below. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 1 is an example of a computer system 30 with which embodiments of the present invention may be utilized. According to the present example, the computer system includes a bus 31, at least one processor 32, at least one communication port 33, a main memory 34, a removable storage media 35 a read only memory 36, and a mass storage 37.

Processor(s) 32 can be any know processor, such as, but not limited to, an Intel® Itanium® or Itanium 2® processor(s), or AMD® Opteron® or Athlon MP® processor(s), or Motorola® lines of processors. Communication port(s) 33 can be any of an RS-232 port for use with a modem based dialup connection, a 10/100 Ethernet port, or a Gigabit port using copper or fiber. Communication port(s) 33 may be chosen depending on a network such a Local Area Network (LAN), Wide Area Network (WAN), or any network to which the computer system 30 connects.

Main memory 34 can be Random Access Memory (RAM), or any other dynamic storage device(s) commonly known in the art. Read only memory 36 can be any static storage device(s) such as Programmable Read Only Memory (PROM) chips for storing static information such as instructions for processor 32.

Mass storage 37 can be used to store information and instructions. For example, hard disks such as the Adaptec® family of SCSI drives, an optical disc, an array of disks such as RAID, such as the Adaptec family of RAID drives, or any other mass storage devices may be used.

Bus 31 communicatively couples processor(s) 32 with the other memory, storage and communication blocks. Bus 31 can be a PCI/PCI-X or SCSI based system bus depending on the storage devices used.

Removable storage media 35 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

The components described above are meant to exemplify some types of possibilities. In no way should the aforementioned examples limit the scope of the invention, as they are only exemplary embodiments.

In conclusion, embodiments of the present invention provide novel systems, methods and arrangements for tracking electronic messages. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method comprising:
   identifying, by a Universal Resource Identifier (URI) insertion routine, an electronic message to be tracked, wherein the identifying is based on the electronic message being classified as virus-infected by a virus scanning routine associated with a commercial anti-virus service or the electronic message being classified as spam by a spam scanning routine associated with a commercial anti-spam service;
   associating, by the URI insertion routine, a linking object with the electronic message to be tracked, the linking object encoded with a destination address of an email submission server associated with the commercial anti-spam service or the commercial anti-virus service;
   responsive to activation of the linking object by a receiver of the electronic message to be tracked, an email client programmatically submitting information regarding the electronic message to be tracked to the commercial anti-spam service or the commercial anti-virus service by creating and sending an email message directed to the destination address and preserving the receiver's privacy by including within the submitted information only signatures of the electronic message and other information associated with the electronic message that facilitate spam or virus analysis;
   wherein the URI insertion routine, the virus scanning routine, the spam scanning routine and the email client are implemented in one or more processors and one or more computer-readable media of one or more computer systems, the one or more computer-readable media having instructions tangibly embodied therein that are executable by the one or more processors;
   wherein the electronic message to be tracked comprises an email message; and
   further comprising archiving the email message on an email storage server and wherein the linking object enables retrieval of an entirety of the email message by the commercial anti-spam service or the commercial anti-virus service.

2. The method of claim 1, wherein the linking object comprises a Universal Resource Identifier (URI).

3. The method of claim 1, wherein the submitted information regarding the electronic message to be tracked comprises an indication to the commercial anti-spam service that the email message has been falsely identified as spam.

4. The method of claim 1, wherein the submitted information regarding the electronic message to be tracked comprises a confirmation to the commercial anti-spam service that the email message has been correctly identified as spam.

5. The method of claim 1, further comprising archiving the email message on an email storage server and wherein the linking object enables retrieval of email signatures from the email message by the commercial anti-spam service or the commercial anti-virus service.

6. A system comprising:
   a Universal Resource Identifier (URI) insertion device configured to cause email messages to be scanned by a program associated with a commercial anti-spam service or a commercial anti-virus service and insert a URI into an email message to be tracked;
   an email submission server, associated with the commercial anti-spam service or the commercial anti-virus service, configured to receive reporting emails sent via the inserted URI by a receiver of the tracked email message;
   an email storage server operative to store an archive of a plurality of email messages into which URIs have been inserted by the URI insertion device;
   wherein the URI is encoded with a destination address of the email submission server; and
   wherein the reporting emails sent via the inserted URI facilitate identification and tracking of spam or viruses by the commercial anti-spam service or the commercial anti-virus service and also preserve the receiver's privacy by including within the reporting emails only signatures of the tracked email message and other information associated with the tracked email message that facilitate spam or virus analysis.

7. The system according to claim 6, wherein the email submission server is further operative to retrieve the tracked email message from the email storage server.

8. The system according to claim 6, wherein the URI insertion device and the email storage server are combined into a single device.

9. A computer-readable storage medium tangibly embodying a set of instructions which when executed by a processor of a computer system:
 identify an electronic message as potential spam or potentially being virus-infected based on the electronic message being classified as virus-infected by a virus scanning routine associated with a commercial anti-virus service or the electronic message being classified as spam by a spam scanning routine associated with a commercial anti-spam service;
 associate a linking object with the electronic message, the linking object encoded with a destination address of an email submission server associated with the commercial anti-spam service or the commercial anti-virus service;
 responsive to activation of the linking object by a receiver of the electronic message, programmatically submit information regarding the electronic message to the commercial anti-spam service or the commercial anti-virus service by creating and sending an email message directed to the destination address and preserving the receiver's privacy by including within the submitted information only signatures of the electronic message and other information associated with the electronic message that facilitate spam or virus analysis;
 wherein the electronic message comprises an email message; and
 archive the email message on an email storage server and wherein the linking object enables retrieval of an entirety of the email message by the commercial anti-spam service or the commercial anti-virus service.

10. A computer-readable storage medium tangibly embodying a set of instructions which when executed by a processor of a computer system:
 identify an electronic message as potential spam based on the electronic message being classified as spam by a spam scanning routine associated with a commercial anti-spam service;
 generate and insert a linking object into the electronic message identified as potential spam, the linking object encoded with a destination address of an email submission server associated with the commercial anti-spam service and configured to automatically report information regarding the electronic message to the commercial anti-spam service responsive to the linking object being activated;
 enable a recipient of the electronic message to initiate programmatic reporting of the information regarding the electronic message to the commercial anti-spam service responsive to activation of the linking object;
 transfer the information regarding the electronic message to the commercial anti-spam service, wherein the receiver's privacy is preserved by including within the transferred information only signatures of the electronic message and other information associated with the electronic message that facilitate spam analysis;
 wherein the electronic message comprises an email message; and
 archive the email message on an email storage server and wherein the linking object enables retrieval of an entirety of the email message by the commercial anti-spam service or the commercial anti-virus service.

* * * * *